United States Patent [19]

Akeel

[11] Patent Number: 5,094,311
[45] Date of Patent: Mar. 10, 1992

[54] LIMITED MOBILITY TRANSPORTER

[75] Inventor: Hadi A. Akeel, Rochester Hills, Mich.

[73] Assignee: GMFanuc Robotics Corporation, Auburn Hills, Mich.

[21] Appl. No.: 659,745

[22] Filed: Feb. 22, 1991

[51] Int. Cl.⁵ .......................................... B25J 11/00
[52] U.S. Cl. ........................ 180/119; 180/8.6; 269/309; 269/900; 901/1; 414/749
[58] Field of Search .............. 414/749, 750, 744.1, 414/744.2, 744.5; 901/1; 180/8.6, 8.1, 8.5, 119; 114/222; 269/389, 900

[56] References Cited

U.S. PATENT DOCUMENTS

| 128,178 | 6/1872 | Sells . | |
|---|---|---|---|
| 1,229,954 | 6/1917 | Hedges . | |
| 1,682,717 | 8/1928 | Corona . | |
| 2,941,481 | 6/1960 | Philbrick | 105/31 |
| 4,018,346 | 4/1977 | Leshem et al. | 414/750 X |
| 4,558,758 | 12/1985 | Littman et al. | 180/8.1 |
| 4,749,330 | 6/1988 | Hine | 414/744.5 |
| 4,790,400 | 12/1988 | Sheeter | 180/8.6 |
| 4,940,382 | 7/1990 | Castelain | 414/750 |

*Primary Examiner*—Robert J. Spar
*Assistant Examiner*—D. Underwood
*Attorney, Agent, or Firm*—Brooks & Kushman

[57] ABSTRACT

A limited mobility transporter (10) is disclosed having a linkage mechanism (12) with four links (14,16,18,20) pivotally connected at their ends to form a four bar linkage. Engagers (22) are mounted at pivotal connections (A,B,C,D) of the links (14,16,18,20) for selectively engaging a mounting surface (24). An actuator assembly (26) rotates the links (14,16,18,20) about the engaged pivotal connections (A,B,C,D). A programmable controller (28) controls a sequence of movements whereby the transporter (10) is movable about the mounting surface (24) by simultaneous engagement of selected engagers (22) and rotation of the links (14,16,18,20) about the selected engagers (22) in a coplaner fashion to the mounting surface (24). In one embodiment, the engagers (22) comprise a shot pin assembly and the mounting surface (24) includes receptacles for receiving the shot pins. In other embodiments, the engagers (22) are electromagnetic anchors or suction cups. The mounting surface (24) is ferromagnetic or includes ferromagnetic inserts when the electromagnetic anchors (22) are used.

20 Claims, 5 Drawing Sheets

Fig. 10

LIMITED MOBILITY TRANSPORTER

TECHNICAL FIELD

The present invention relates to a mechanical device and method for transporting equipment within a limited planar space and more specifically to a transporter and method for positioning such equipment within such space.

BACKGROUND ART

In manufacturing plants it is customary to transport equipment, such as machine loading devices, pallets, and robots, from one location to another. Where the equipment is shuttled between two locations positioned on a simple geometric path, linear slides or rotating tables are normally used. Typically, conveyors, belts, and link chains are utilized for longer travel and for negotiating winding paths around other machines and equipment. Furthermore, automatically guided vehicles, AGV's, have the capability to trace guide wires, or markings on, or within, a shop floor allowing greater mobility and eliminating the need for guide structure on the shop floor.

AGV's can also cover considerable distances and can have the ability to be programmed to trace variable paths depending on material routing requirements. Computer control systems provide the capability to communicate along the guide wires, or wirelessly, with central plant computers to receive route commands. AGV systems require sophisticated control systems on-board the AGV as well as at a central location that coordinates their motion. They also require an on-board power source, usually batteries, to propel them between loading stations. A power distribution system is also necessary to re-charge the batteries at loading stations by means of a plug and socket arrangement. The flexibility and extensive mobility of AGV systems is reflected in their cost and often makes them too expensive for many applications requiring limited mobility.

The high level of sophistication of the AGV control and guidance systems, which involves advanced sensing technologies, makes their maintenance and operation also a challenge for many enterprises, and well outside the capability of many potential users. The need is well recognized for a simple, low cost, transporting device and location method that supports equipment relocation requirements when limited mobility is sufficient.

AGV's also have a problem of not providing accurate position or height location for the transported equipment. This is particularly significant if robots are transported and are programmed to operate with a high level of accuracy at several locations.

Prior art references noted by a search conducted prior to filing this application are discussed below.

U.S. Pat. Nos. 128,178 to Sells; 1,229,954 to Hedges; 1,682,717 to Corona; and 2,941,481 to Philbrick disclose various motor driven vertically disposed linkages for propelling supported vehicles. These patents teach the conversion of rotation in a horizontal plane into displacement of linkages in a vertical plane.

U.S. Pat. No. 4,558,758 to Littman et al discloses a mobile robot having a central body and legs with wheels which allow movement both up and down as well as sideways.

U.S. Pat. No. 4,790,400 to Sheeter discloses a stepping vehicle that uses at least two sets of telescopically extendable legs that are mounted on a work platform for translational movement. The vehicle can "walk" by controlling the telescopic extension of the legs while at the same time controlling the translational movement of the legs with respect to the work platform.

DISCLOSURE OF INVENTION

An object of the present invention is to provide a simplified transporting device that provides for limited mobility on a generally planar surface.

It is another object of the invention to provide a positioning device capable of accurate positioning of equipment on the generally planar surface.

Another object of the invention is to provide a method for guiding and positioning the transporting/positioning (T/P) device.

It is still another object of the invention to provide a method that allows programmable guidance of the T/P device, within a two dimensional space.

Another object is to provide a low cost T/P device that is simple to operate and maintain.

A further object of the invention is to provide a T/P device capable of locating its height with a high level of accuracy at discrete stop locations.

A still further object of the invention is to provide a T/P device operable on varied planes of general orientation with respect to gravity.

A more specific object of the invention is to provide a linkage mechanism having four links connected at their ends by pivotal connections forming a four bar linkage. An engager is located at each pivotal connection and is operable for being selectively engaged to a mounting surface. An actuator assembly is provided to rotate the linkage mechanism about two adjacent engaged pivotal connections, in a coplanar fashion to the mounting surface, to move the transporter about the mounting surface by the simultaneous engagement of the selected engagers and rotation of the linkage mechanism.

In the preferred embodiment of the invention, one of the links that form the four bar linkage defines a work platform for supporting an object to be moved. In one embodiment of the invention, the engagers comprise a vertically actuable shot pin assembly and the mounting surface includes receptacles for receiving the shot pins.

In a second embodiment of the invention, the engagers comprise an electromagnetic anchor assembly and the mounting surface is ferromagnetic or it includes ferromagnetic inserts.

In a third embodiment of the invention, the engagers comprise a suction cup assembly engageable on any variety of planar mounting surfaces.

Preferably, the transporter further includes a programmable controller for controlling the engagers and the actuator. Thereby, the controller controllably guides and positions the transporter about the mounting surface through sequential movements. In this preferred embodiment, the work platform includes casters which support the transporter for rolling engagement on the mounting surface to establish a fixed height of the work platform with respect to the mounting surface, reduce frictional resistance to the movement of the T/P, and free the pivots of the engagers from gravitational loads. Alternatively, air support blocks can be employed to support the transporter by an air cushion on the mounting surface.

The method of moving objects over a surface by the transporter includes sequentially engaging a pair of adjacent pivotal connections, rotating the linkage, disengaging the engaged pivotal connections, engaging another pair of adjacent pivotal connections, and rotating the linkage mechanism to move the work platform over the mounting surface.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
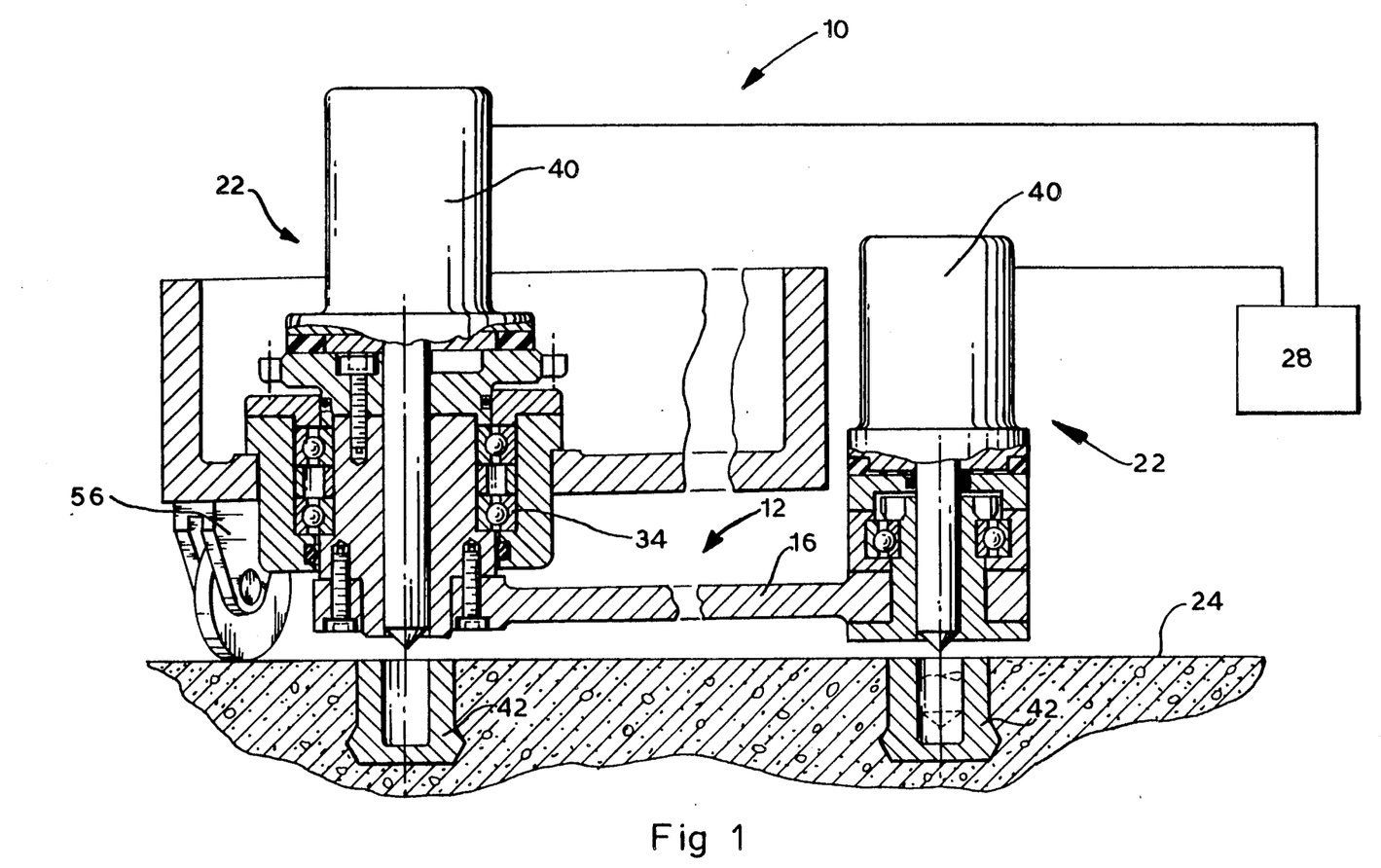
FIG. 1 is a schematic view of a transporter constructed in accordance with the present invention illustrating a first embodiment of the invention.

With reference to FIG. 1 of the drawings, a transporter constructed in accordance with the present invention is generally indicated by reference numeral 10 and is used to move objects or equipment about a planar mounting surface. As is more fully hereinafter described, the transporter 10 is operable to accurately position equipment on the planar mounting surface through sequential movements.

Figure 2:
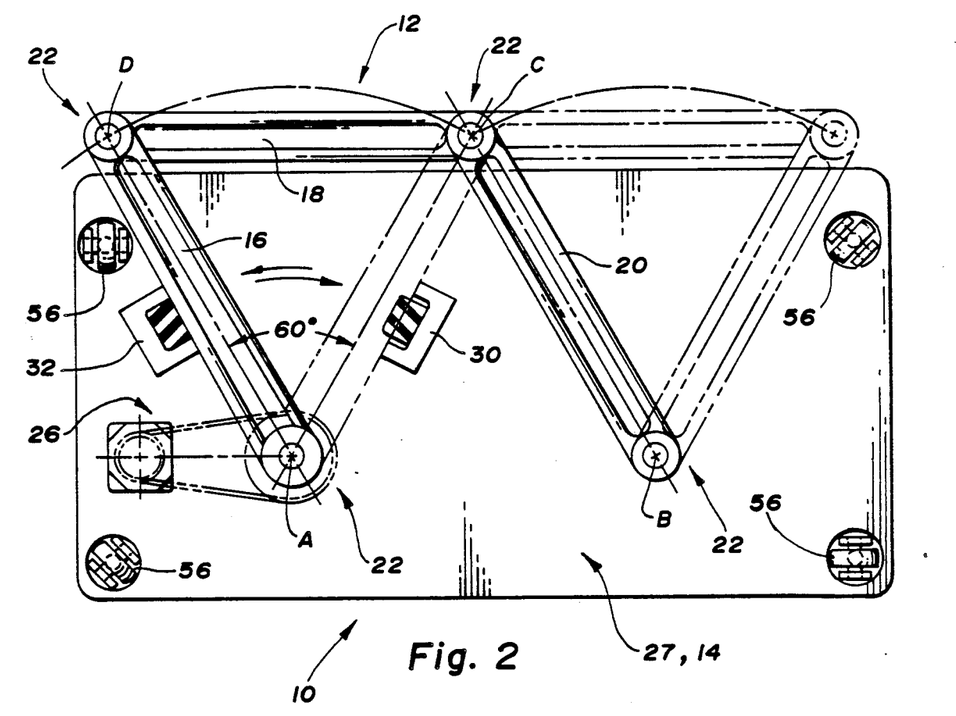
FIG. 2 is a plan view of the underside of the transporter illustrating a four bar linkage construction and the parameters of movement of the linkage.
Figure 3:
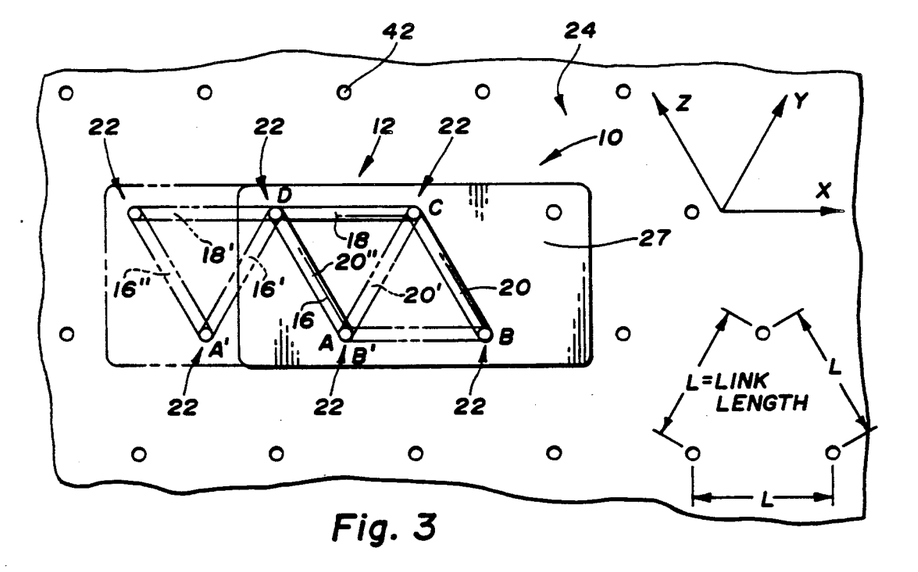
FIG. 3 is a plan view of a mounting surface illustrating a pattern of engagement points; an X, Y and Z frame of reference; and a transporter mounted for movement on the surface.

As shown in FIGS. 1 and 2 of the drawings, the transporter 10 includes a linkage mechanism 12 having four links 14, 16, 18, 20 connected at their ends by pivotal connections A, B, C, D to form a four bar linkage. An engager 22 is mounted at each pivotal connection. The engagers 22 are operable for selectively engaging two adjacent pivotal connections to a mounting surface 24, as shown in FIG. 3. An actuator assembly 26 is actuable for rotating the links 14, 16, 18 and 20 about the engaged pivotal connections, in a coplanar fashion to the mounting surface 24, whereby the transporter 10 is movable about the mounting surface by the simultaneous engagement of the selected engagers and rotation of the links.

As shown in FIG. 2, one of the links 14 defines a work platform 27 for supporting the equipment to be moved. Two other links 16 and 20 are rotatably hinged to the work platform The remaining link 18 is rotatably hinged to links 16 and 20. The four links 14, 16, 18 and 20 form a parallel four bar linkage mechanism, hence links 14 and 18 are of equal length and links 16 and 20 are of equal length. Preferably, and for maximum flexibility of motion, all four links 14, 16, 18 and 20 are of equal length.

An actuator assembly 26 is operable to rotate link 16 relative to the work platform 27 or link 14. Preferably, link 16 is allowed to move relative to the platform 27 between limits spaced 60° apart. Shock absorbing stop blocks 30,32 can be used to limit the movement of link 16 and to cushion the stop at each end and preventing impact at the end of travel from damaging the linkage mechanism 12 and its bearings 34. Alternatively, actuator assembly 26 can be servo driven with programmable accelerations and decelerations that accomplish the same objective. Preferably, a programmable controller 28 controls the operation of the engagers 22 and actuator 26.

The engagers 22 at each pivotal connection can be selectively actuated to engage the mounting surface 24. When two adjacent engagers 22, other than those located at pivotal connections A and B, are actuated to engage mounting surface 24 and actuator assembly 26 is operated to rotate link 16, relative to link 14, thereby causing reconfiguration of the four bar linkage, the transporter 10 moves about the mounting surface 24. When adjacent engagers 22 located at pivotal connections A and B are engaged and actuator assembly 26 is operated, the four bar linkage is reconfigured without causing the transporter 10 to move.

In a first embodiment of the invention illustrated in FIG. 1, the engagers 22 at each pivotal connection A, B, C, and D comprise a shot pin assembly 40. In this embodiment, mounting surface 24 includes engagement points 42, defined by receptacles in the mounting surface. Each shot pin 40 can be extended through the center of a pivotal connection to engage a receptacle thereby fixing that pivotal connection to the mounting surface. In one arrangement of the first embodiment, a pneumatically operated cylinder is used to extend and retract a selected shot pin 40 according to a programmed sequence. In other arrangements, hydraulic, mechanical or electrical actuators may be used to extend and retract shot pins 40. It is obvious that shot pins 40 can be designed to engage receptacles 42 such that the engagement can withstand appreciable shear as well as tensile (pull) forces.

Figure 4A:
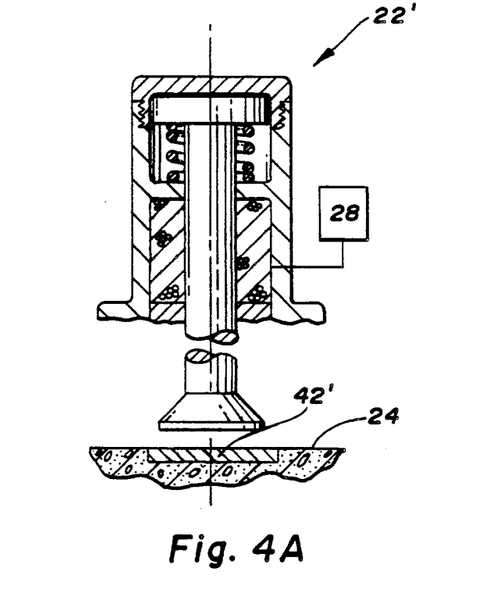
FIGS. 4A and 4B are cross-sectional partial views of the transporter of FIG. 1 illustrating a second embodiment of the invention.
Figure 4B:
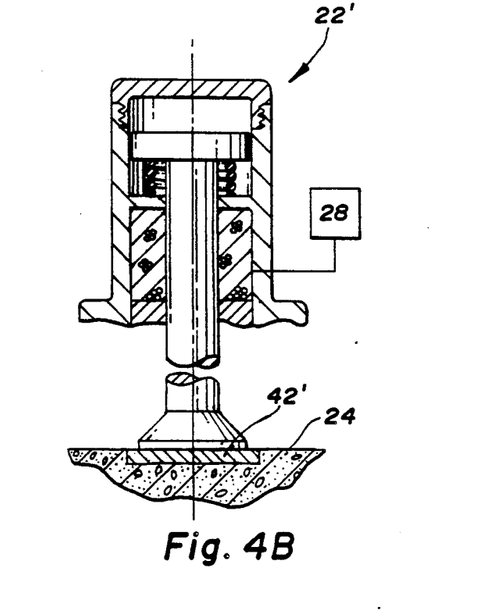

FIGS. 4A and 4B illustrate an engager 22' which when substituted for the shot pin assembly 40 defines a second embodiment of the transporter 10'. The engager 22' comprises an electromagnetic anchor assembly for use with a mounting surface 24 of a ferromagnetic material or wherein ferromagnetic inserts define engagement points 42'. Therein engagers 22', a core made of soft iron and having a minimal residual magnetism is wrapped within a wire coil composed of several layers of coiled wire terminated at terminal ends and enclosed in a casing. The core is guided for coaxial movement inside the casing and is applied with a return coil spring which forces the core upward to engage a stop bracket. When the coil is energized by a DC voltage, the core is magnetized and is attracted to engage the ferromagnetic inserts 42'. This operation is equivalent to engaging the shot pin 40 in a floor receptacle 42. The electromagnet can be designed to provide a holding force to the mounting surface 24 large enough to withstand turning moments and the pull forces of gravity.

Instead of providing ferromagnetic inserts in the mounting surface 24, a continuous ferromagnetic floor surface can be utilized. The use of electromagnetic anchor assembly 22' allows the use of a smooth mounting surface suitable for other uses eliminating the need for a specific geometric pattern of the engagement points 42'. The smooth mounting surface also allows the T/P to be moved in variable increments independent of the linkage dimensions. Sensing means of many types can be used to guide the transporter to accurately defined locations, for example, color contrasting patterns can be marked on the mounting surface 24 and read by optical means to determine the exact location of the transporter 10 at any instant and correct for any deviation. Deviations are corrected by rotation of link 16 relative to the work platform 27 or link 14, through some arc less than 60°, in order to re-align the transporter along the desired path.

Figure 5A:
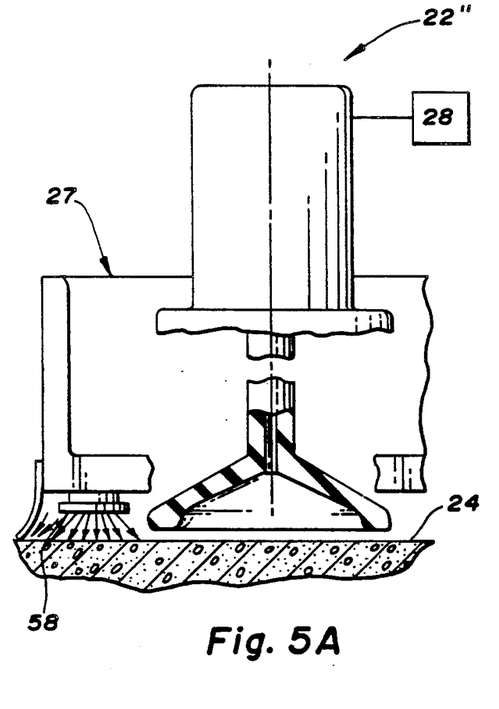
FIGS. 5A and 5B are cross-sectional partial views of the transporter of FIG. 1 illustrating a third embodiment of the invention.
Figure 5B:
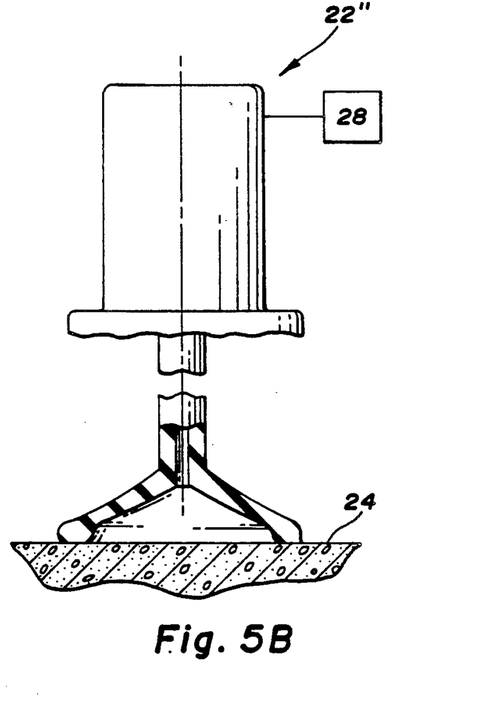

FIGS. 5A and 5B illustrate a third engager 22" that comprises a suction cup assembly which when substituted for the shot pin assembly 22 in FIG. 1 defines a third embodiment of the transporter 10". The suction cup assembly 22" is used to engage the transporter 10" to a smooth mounting surface 24. The suction cup assembly 22" includes a vacuum source connected to the suction cups and when communicated to the suction cups attracts the suction cup to the mounting surface 24 providing a holding force. The force of the vacuum can be selected to support the moments and shear forces of the actuator assembly 26. The suction cup engager 22" as well as the electromagnetic engager 22', can be utilized on inclined mounting surfaces 24 provided the suction forces are selected by design to withstand the drive moments as well as the shearing and pull forces of gravity. As with the electromagnetic engager 22', the sensing means of correcting path deviation as hereabove described is utilized with the suction cup engager 22".

It should also be noted that a releasable adhesive surface may also be used instead of suction cups or electromagnets.

Figure 6:
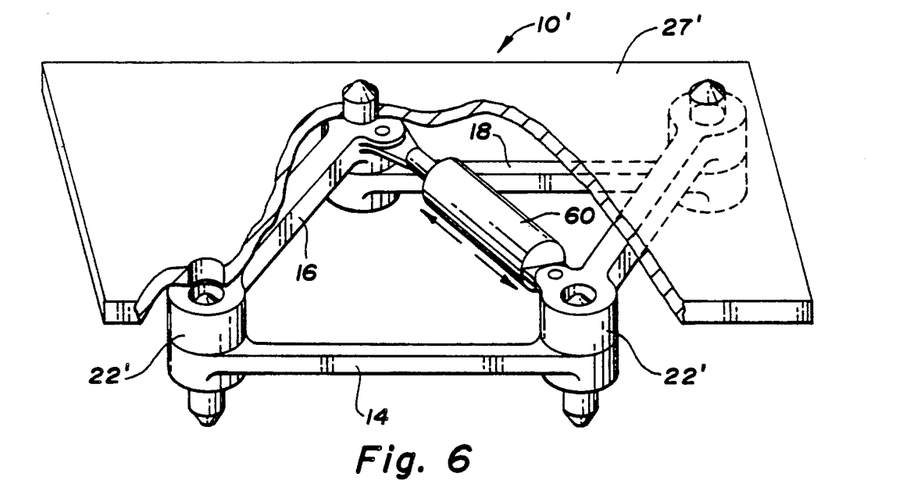
FIG. 6 is a cut-away perspective view of a transporter constructed in accordance with a fourth embodiment of the invention illustrating means for selectable engagement between the transporter and a mounting surface.

In a fourth embodiment of the transporter 10', illustrated in FIG. 6, its construction provides a selectable engagement between linkage mechanism ABCD and either of, platform 27' mounted on linkage mechanism 12', or mounting surface 24 whereby any pair of adjacent pivot points AB, BC, DC, or DA, are selectably engaged to platform 27' while the other pair of joints is engaged to the mounting surface 24. This selective engagement is provided by double-ended engager means 22' and allows the platform 27' to move with each actuation of link 16 relative to an adjacent link such as link 14 or link 18. As shown through the sequence of movement illustrated in FIG. 7, the reversal of the relative motion between link 16 and an adjacent link, coupled with a reversal of the engagement of the pivotal joints, causes the platform to move in the same direction with each actuation of link 16 without repositioning.

Figure 7:
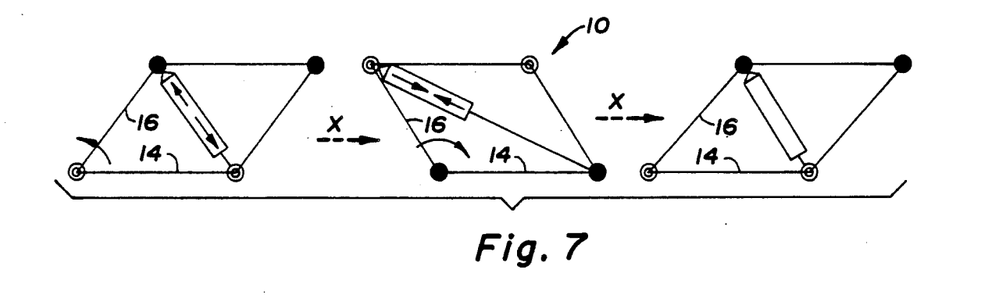
FIG. 7 is three schematic views illustrating a sequence of movements of the transporter of FIG. 6.

In FIG. 7, the solid circles at the pivotal joints schematically illustrate that that pivotal joint is engaged to mounting surface 24. Alternatively, the pivotal joints schematically represented by an open circle having a circle therein illustrate that that pivotal joint is engaged to work platform 27'. The character X represents the direction of movement of platform 27' according to the shown actuator action.

Figure 8:
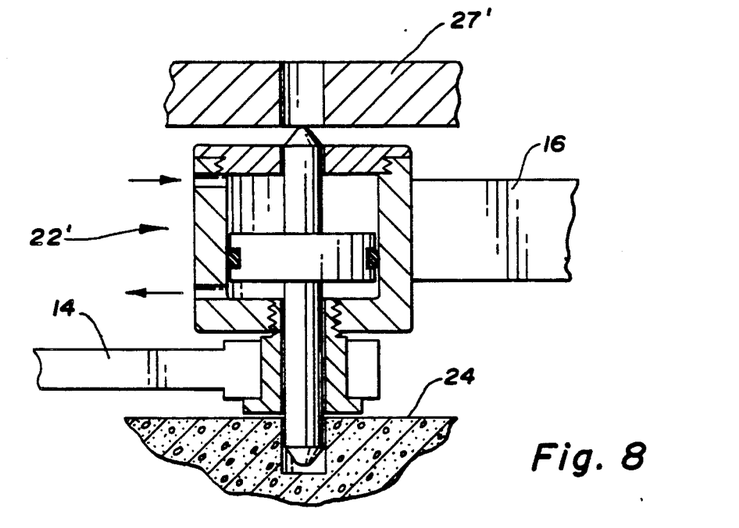
FIG. 8 is a cross-sectional partial view of the transporter of FIG. 6 illustrating a double-ended shot pin assembly.
Figure 9:
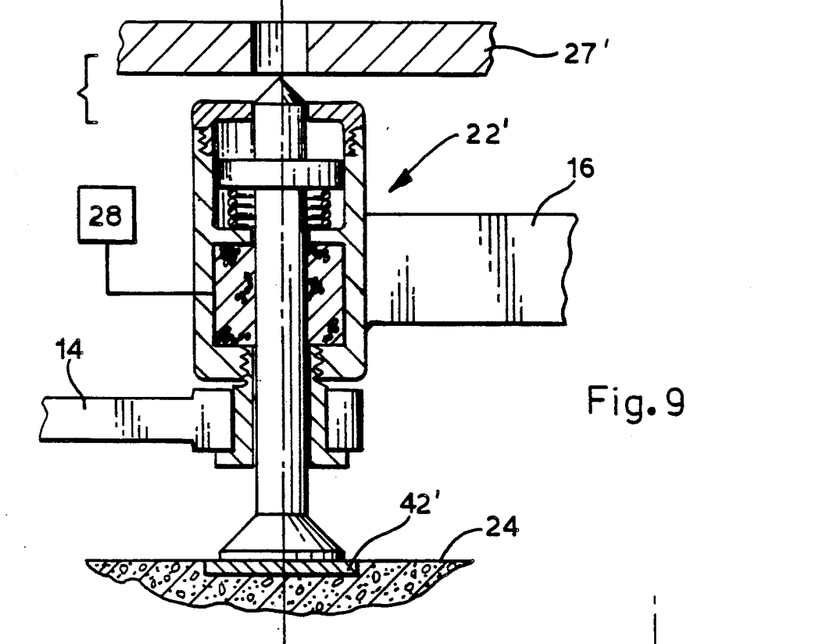
FIG. 9 is a cross-sectional partial view of the transporter of FIG. 6 illustrating a double-ended shot pin-electromagnetic anchor assembly.
Figure 10:
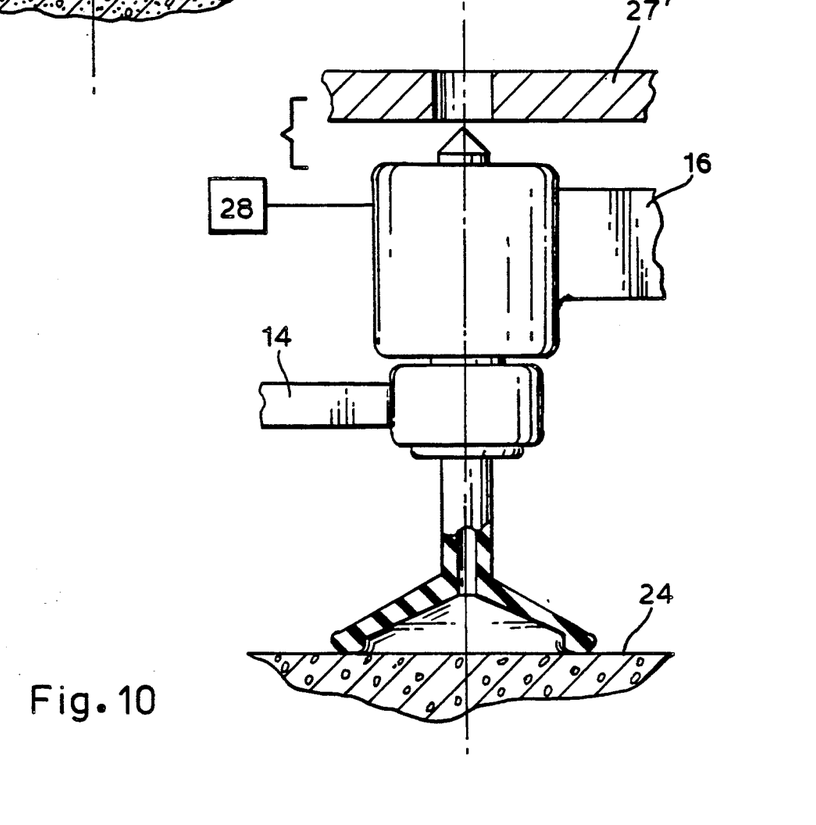
FIG. 10 is a cross-sectional partial view of the transporter of FIG. 6 illustrating a double-ended shot pin-suction cup anchor assembly.

In this fourth embodiment, when any of the four joints 22 is engaged to the mounting surface 24, it is freed from engagement to the platform 27', and vice versa. This is accomplished by the actuation of either a double-ended shot pin (illustrated in FIG. 8), electromagnet, or suction cup engager to reciprocate between the engagement to mounting surface 24, or platform 27'. Such engager means 22' may be used exclusively or in combination. For example, a pin arrangement may be preferred for the well defined platform position while suction cups, FIG. 10, or electromagnets, FIG. 9 may be used for the engagement with the mounting surface 24. FIGS. 6 and 8 illustrate a double-ended shot pin arrangement.

In this fourth embodiment, the common link between the mechanism 10' and the platform 27', link AB, or 14, of FIG. 2, is changeable depending on which adjacent pair of joints is engaged to platform 27. Hence, the mechanism is best when constructed with an actuator 60 mounted on the mechanism linkage as shown in FIG. 6, rather than on the platform 27. Actuator 60 is a linear actuator and is preferred, vis a vis rotary actuators.

While a four-bar linkage is described with a single actuator, the invention is applicable to any single degree of freedom mechanism, and to redundant mechanisms when used with the necessary number of constraining actuators. For example, linkage 18 can be eliminated, or replaced by two pivotally connected links, and two actuators are used to drive both of links 16 and 20 relative to link 14 and in coordination with each other.

Referring again to FIG. 1 of the drawings, the work platform 27 preferably includes castors 56 mounted thereon which support the forces of gravity, electromagnets, and suction cups acting on the transporter 10 for rolling engagement on the mounting surface 24. Alternatively, and as illustrated in FIG. 5A, the transporter 10 includes air support blocks 58 which support the transporter by an air cushion on the mounting surface 24.

Operation of the Invention

With reference to FIGS. 2 and 3 of the drawings, work platform 27 is movable in any direction along any of the X, Y or Z axes depending on a specific sequence of operations. While the following description of the operation of the invention relates specifically to the use of shot pin engagers, the description is equally applicable to the use of electromagnetic or suction cup engagers when the engagement points 42' and 42" have the same pattern as hereby described for shot pin engagers.

To move the work platform 27 along any particular axis, link 14 defined by end points A,B is oriented parallel to that axis. For example: to move along the negative direction of the X axis, the shot pin assembly 40 at pivotal connections C and D are engaged to receptacles in the mounting surface 24. Actuator assembly 26 is operated to rotate link 16 in a clockwise direction until stop block 30 engages link 16 and stops its motion. Work platform 27 is thereby moved along the X axis in a negative direction. For further movement in the same direction, the shot pin assemblies 40 at pivotal connections A and B which are now over new receptacles A', B' in the mounting surface 24 are engaged and the shot pin assemblies are disengaged at pivotal connections C and D. Actuator assembly 26 is then operated in a counter-clockwise direction to displace link 16 from position 16' to position 16" until stop block 32 engages link 16 at position 16" and link 20 from position 20' to position 20". This operation does not cause the work platform 27 to move, but repositions its linkage for a new sequence. If the sequence is reversed, the platform moves to the opposite direction.

As can be seen, engaging pivotal connections A and B or C and D and rotating the linkage mechanism 12 by actuator assembly 26 moves the work platform 27 along a longitudinal axis parallel to link 14. Similarly, the sequence of engaging pivotal connections B and C and rotating link 16 in a clockwise fashion rotates the work platform 27 about pivotal connection B by 60° in a counter-clockwise direction. The sequence of engaging pivotal connections A and D and rotating link 16 in a clockwise direction effects a counter-clockwise rotation about joint A. Both sequences orient the work platform 27 for movement along the Y axis. Subsequent pairings of engagement of pivotal connections A and B or C and D or vice-versa move the work platform 27 along the Y axis in a manner similar to the movement in the X direction.

The work platform 27 can also be oriented for movement along the Z axis by the further rotation of the work platform 27 as hereinabove discussed. Similarly, movement in the Z direction can be effected. When rotation of the work platform 27 is repeated six times, the work platform has rotated 360°.

The work platform 27 is capable of movement that covers a full two dimensional space of the mounting surface 24. As the work platform 27 can be accurately located at any discrete location represented by any two adjacent engagement points, it becomes easy to program the movements of the transporter 10 on a computer.

While the operation of the invention has been described in terms of the transporter 10 including an engager 22 comprising the shot pin assembly 40, the other embodiments of the transporter are similarly operated. However, in general, and especially when a smooth surface 24 is used with electromagnetic or suction cup engagers, the T/P can be programmed to move in increments other than 60°, thereby effecting movements in any direction. All four links can also be of different lengths. Furthermore, when the incremental movements of the shot pin embodiments is different from 60°, the pattern of holes 42 is correspondingly ordered. The description has also focused on motion in a horizontal plane although the invention applies equally well with inclined, vertical, or inverted surfaces where gravitation forces may act to pull the transporter off the plane of movement.

While the best mode for carrying out the invention has been described in detail, those familiar with the art to which this invention relates will recognize various alternative designs and embodiments for practicing the invention as defined by the following claims.

What is claimed is:

1. A transporter for movement along a predetermined path along a mounting surface, the transporter comprising:
   a linkage mechanism having four links connected at their ends by pivotal connections to form a four bar linkage;
   an engager mounted at each pivotal connection operable for selectively engaging two adjacent pivotal connections to the mounting surface; and
   an actuator assembly connected to one of said links for rotating said links about said two adjacent pivotal connections in a coplanar fashion to the mounting surface whereby the transporter is movable about the mounting surface by the simultaneous engagement of said selected engagers and rotation of said links whereby releasing said engaged pivotal connections after rotation of said links and engaging another pair of adjacent pivotal connections and rotating said links about said another pair of adjacent pivotal connections provides sequential movement of the work platform relative to the surface.

2. A transporter for moving objects along a predetermined path along a mounting surface, the transporter comprising:
   a linkage mechanism having four links connected at their ends by pivotal connections to form a four bar linkage; one of said links defining a work platform for supporting the object to be moved;
   an engager mounted at each pivotal connection operable for selectively engaging two adjacent pivotal connections to the mounting surface; and
   an actuator assembly connected to one of said links for rotating said links about said two adjacent pivotal connections in a coplanar fashion to the mounting surface whereby the transporter is movable about the mounting surface by the simultaneous engagement of said selected engagers and rotation of said links whereby releasing said engaged pivotal connections after rotation of said links and engaging another pair of adjacent pivotal connections and rotating said links about said another pair of adjacent pivotal connections provides sequential movement of the work platform relative to the surface.

3. A transporters as in claim 2 wherein said engager comprises a shot pin assembly and said mounting surface includes receptacles for receiving said shot pins.

4. A transporter as in claim 3 wherein said shot pin assembly includes a mechanical actuator for extending and retracting said shot pins.

5. A transporter as in claim 3 wherein said shot pin assembly includes a pneumatic actuator for extending and retracting said shot pins.

6. A transporter as in claim 1 wherein said engager comprises an electromagnetic anchor assembly and said mounting surface includes ferromagnetic inserts.

7. A transporter as in claim 1 wherein said engager comprises a suction cup assembly.

8. A transporter as in claim 1 further comprising a programmable controller for controlling said engagers and actuator.

9. A transporter as in claim 1 wherein said actuator assembly comprises an electric motor and mechanical motion transmission means.

10. A transporter as in claim 1 further including a work platform adjustably mountable on said linkage mechanism.

11. A transporter as in claim 10 wherein said engagers are also operable for selectively engaging said work platform on said linkage mechanism thereby coupling said work platform to said linkage mechanism by the engagement.

12. A transporter as in claim 11 wherein said actuator is a linear actuator having ends pivotally connecting opposite pivotal connections of said linkage mechanism.

13. A transporter as in claim 12 wherein said engagers comprise a double-ended shot pin assembly.

14. A transporter as in claim 12 wherein said engagers comprise a double-ended electromechanical anchor assembly.

15. A transporter as in claim 12 wherein said engagers comprise a double-ended suction cup assembly.

16. A transporter as in claim 2 or 10 wherein said work platform includes casters which provides rolling engagement for the transporter relative to the mounting surface.

17. A transporter as in claim 2 or 10 wherein said work platform includes air support blocks having peripheral seals which provide an air cushion between the transporter and mounting surface.

18. A method of moving objects supported on a work platform relative to a surface comprising:

engaging selected adjacent pivotal connections of a linkage mechanism defining the work platform to the surface; and rotating said linkage mechanism about said engaged pivotal connections in a coplanar fashion to the surface to move said links and the objects supported on the work platform about the surface; releasing said engaged pivotal connections after rotating; engaging another pair of adjacent pivotal connections and rotating said links about said another pair of adjacent pivotal connections to provide sequential movement of the work platform relative to the surface.

19. A method as in claim 18 further comprising connecting four links together at their ends by pivotal connections thereby forming a four bar linkage mechanism.

20. A method as in claim 18 further comprising determining the location of the transporter with respect to the surface, and correcting errors in the location of the transporter by actuating partial rotation of said links about engaged pivotal connections.

* * * * *